United States Patent [19]

Hirose

[11] Patent Number: 4,635,996
[45] Date of Patent: Jan. 13, 1987

[54] VEHICLE BODY COVER

[76] Inventor: Tokuzo Hirose, 13-13, Higashiyamacho, Ashiya-shi, Hyogo-ken, Japan

[21] Appl. No.: 691,753

[22] Filed: Jan. 15, 1985

[30] Foreign Application Priority Data

Oct. 4, 1984 [JP] Japan ................. 59-208648

[51] Int. Cl.⁴ .............................................. B62D 39/00
[52] U.S. Cl. ................................................. 296/136
[58] Field of Search ................... 296/136; 150/52 K

[56] References Cited

U.S. PATENT DOCUMENTS 1,584,518  5/1926  Drake ........................... 296/136
2,048,461  7/1936  Mosgoffian .................... 296/136
4,164,233  8/1979  McAndrew ..................... 296/136
4,184,501  1/1980  Johnson ........................ 296/136

FOREIGN PATENT DOCUMENTS 246268  1/1926  United Kingdom ............... 296/136

Primary Examiner—Robert R. Song
Attorney, Agent, or Firm—Wenderoth, Lind & Ponack

[57] ABSTRACT

A vehicle body cover being formed of a covering sheet which is waterproof and weatherproof. The covering is attached on its outer periphery to parts of a vehicle body such that the functions of the vehicle are not impaired and the doors thereof are allowed to freely open and close.

2 Claims, 4 Drawing Figures

VEHICLE BODY COVER

BACKGROUND OF THE INVENTION

1. Field of the Invention

The present invention relates to a vehicle body cover adapted for covering the outside surface of the vehicle body.

2. Description of the Prior Art

Heretofore available is a covering sheet as a means for covering the vehicle body. The covering sheet is used for shielding an automobile and the like from rain or sun rays when it is parked and the automobile cannot travel while being covered therewith. Furthermore, it is generally known that the upper part of the automobile is covered with leather, while the lower part thereof is coated with paint, or its upper and lower parts are coated in colors, patterns or designs different from each other.

Since for such coating, baking method or the like is employed, and the automobile is coated thereby, the color or colors cannot be easily altered. In the case where colors in a desired automobile type are different from one another, sometimes, an automobile of the type coated in the desired color can not be readily purchased because it is inconveniently not on hand. If the automobile body is damaged or rusted, the plate metal must then be reapplied on the automobile surface or its coating must be done all over again. Moreover it is difficult to coat the affected parts and the parts surrounding them in exactly the same color, thereby giving rise to a situation where replacement of parts or recoating of the whole of the automobile body is required, which is expensive and requires a great deal of labor. Moreover, the thus coated automobile surface should be waxed for maintaining its durability and luster, which work also takes time and labor.

SUMMARY OF THE INVENTION

Accordingly, to solve the aforementioned problems, it is an object of the present invention to provide an improved and novel vehicle body cover.

It is another object of the invention to provide a vehicle body cover which enables not only the color of the vehicle body to be readily altered, but eliminates the trouble of doing work such as waxing.

To accomplish the above objects, the present invention provides a vehicle body cover of the covering sheet type, the vehicle body cover having resistance to water and weathering and being removably attached on its outer periphery to parts of a vehicle body such that the functions of the vehicle are not impaired and the doors thereof are allowed to freely open and close.

Consequently, according to this invention, on the peripheral parts of the vehicle body which are not affected by the covering, a covering sheet which is waterproof and weatherproof is removably attached, in such a manner that the doors and the like are allowed to open and close, so that not only the color and pattern of the vehicle body may be easily altered, but also waxing can be avoided.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
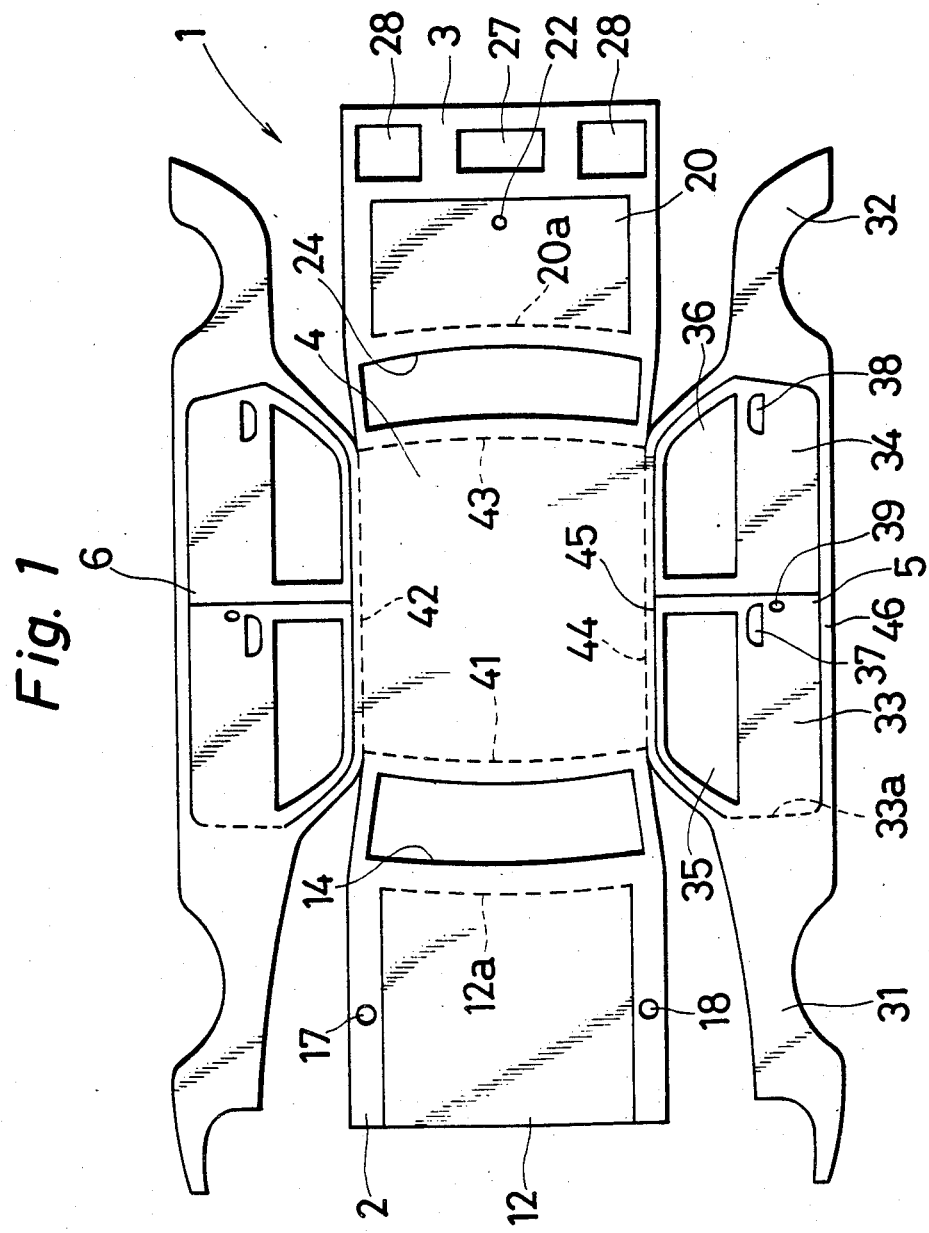
FIG. 1 is an expansion plan showing an embodiment of the invention.

Referring now to the drawings, embodiments of the invention are described below.

Figure 2:
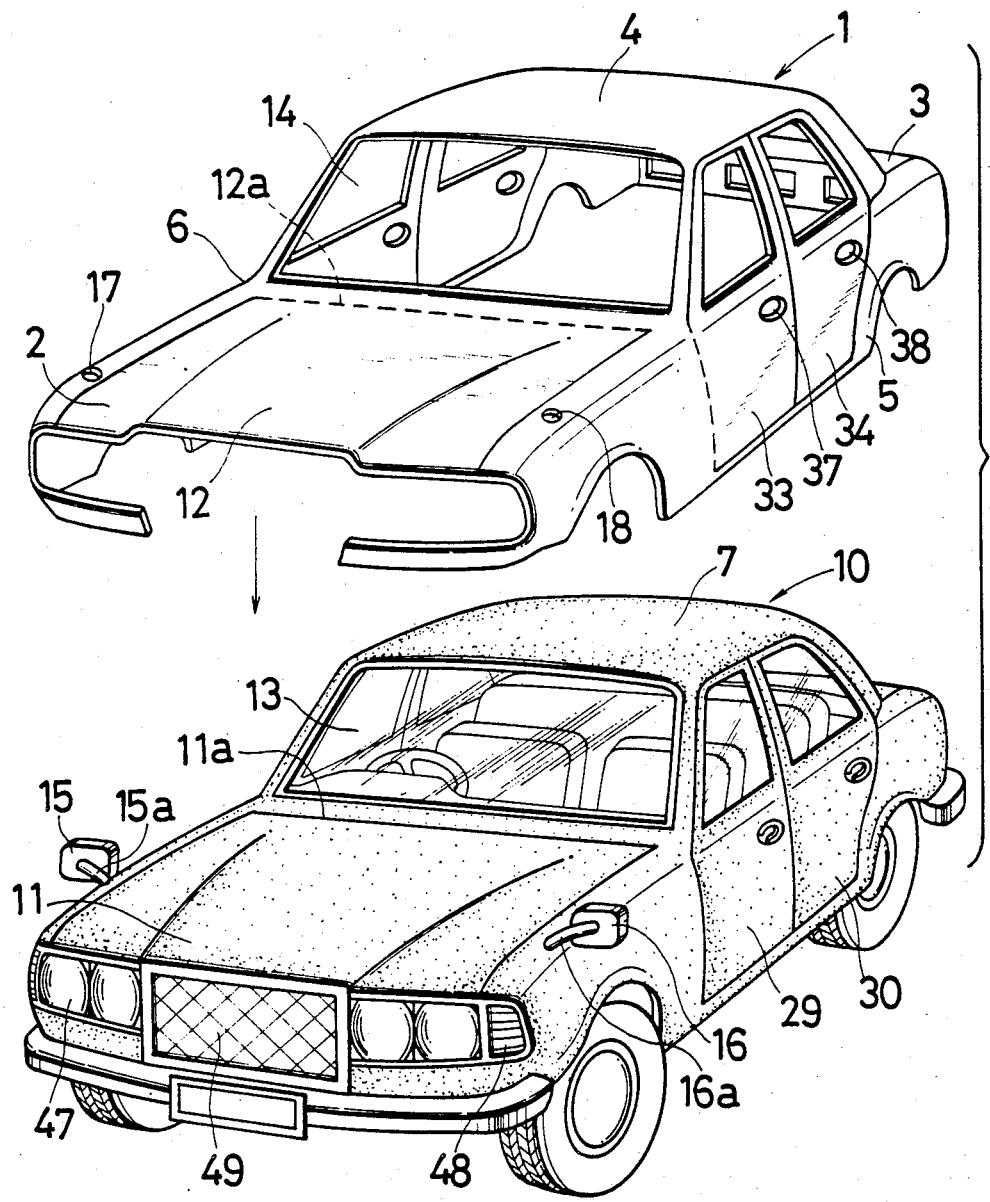
FIG. 2 is a perspective view showing a manner in which a cover is put on an automobile body.
Figure 3:
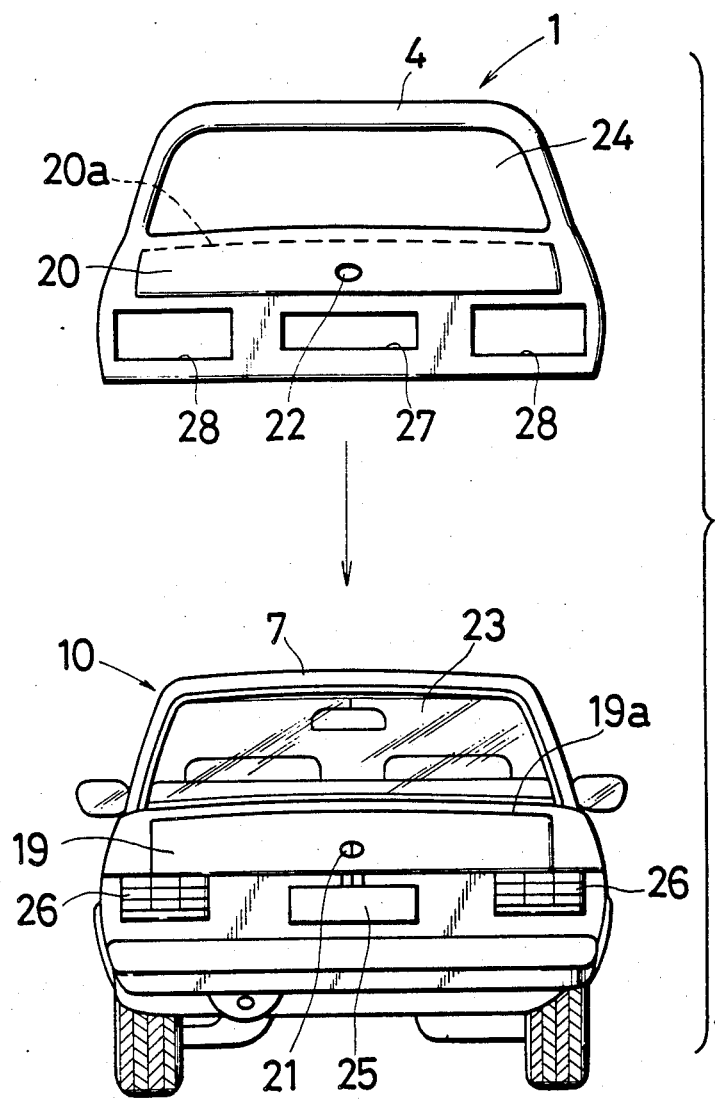
FIG. 3 is a back elevation of FIG. 2.

FIG. 1 is an expansion plan of an embodiment of this invention, FIG. 2 is a perspective view showing a mode or manner in which a cover 1 according to this invention is put on an automobile body 10, and FIG. 3 shows a rear view of the automobile body.

The cover 1 comprises, a basically, front cover part 2 for covering a front part of the automobile body 10, a rear cover part 3 for covering a rear part of the automobile body 10, a roof cover part 4 for covering a roof part 7 of the automobile body 10, and a pair of side cover parts 5 and 6 for covering both sides of the automobile body 10. The cover 1 is formed of a covering sheet which is waterproof and weatherproof, which may be, for example, a cloth or a nonwoven sheet of a flexible synthetic resin.

In the front covering part 2 of the cover 1, a hood covering part 12 is provided at the position corresponding to a hood 11 of the automobile body 10. The hood covering part 12 is made such that a portion 12a, shown by dotted lines which corresponds to a hinge part 11a of the hood 11, is not cut, while the other parts are cut, thereby allowing the hood 11 to freely open and close. At the front covering part 2, a rectangular-like blank 14 is cut out in a shape corresponding to a windshield 13. Similarly, at positions corresponding to rear view mirrors 15 and 16, holes 17 and 18 are formed for insertion of leg parts 15a and 16a, respectively, of the rear view mirrors 15 and 16.

In the rear covering part 3 of the cover 1, as shown in FIG. 3, which is similar to the front covering part 2, a covering part 20 for covering a trunk lid 19 of the automobile body 10 is formed at a position corresponding thereto. The covering part 20 is made such that a part 20a, shown by dotted lines which corresponds to a hinge part 19a of the trunk lid 19, is not cut, while the other parts are cut, thereby enabling the trunk lid 19 to freely open and close.

In the covering part 20, a key insertion hole 22 is formed at a position corresponding to a trunk lock hole 21. In the rear covering part 3, there is formed not only a quasi-rectangular blank 24 which is cut in the shape corresponding to a rear window 23, but also a rectangular blank 27 for a license plate 25 and rectangular blanks 28 for rear taillights 26 which are respectively cut in the shapes corresponding thereto.

The side covering part 5 has a first covering part 31 for a front fender, a second covering part 32 for a rear fender, a third covering part 33 for a front door 29, a fourth covering part 34 for a rear door 30, an upper connection covering part 45, and a lower connection covering part 46. In the covering part 33 for the front door, a hinge part shown by dotted lines 33a is not cut, while the other parts are cut in the shape corresponding to the front door 29. In the front door covering part 33, there are formed a cut-out part 35 for a front door window, and another cut-out part 37 for a handle and a key-inserting hole 39. The rear door covering part is cut in the shape corresponding to the rear door 30 of the automobile body 10. In the rear door covering part 34, there are formed a cut-out part 36 for a rear door window and a cut-out part 38 for a handle. The side covering part 6 on the other side of the automobile body 10 is of the same construction as the side covering part 5.

After the cover 1 is cut as shown in the expansion plan of FIG. 1, it is bent along the parts of the bending lines 41 to 44 indicated by dotted lines, so that the cover is constructed in a three dimensional form in correspondence with the automobile body 10. Thereafter, the cover 1 is removably attached with an adhesive or the like to the outer peripheral part of the automobile body 10. At this time, the parts of the automobile body including headlights 47, turn signals 48, and radiator grill 49 which, if covered would be hindered in fullfilling their functions for automobile's travel, are not covered. The parts of the automobile body 10, e.g., the front window 13, rear window 23, door windows, license plate 25, and taillights 26 are not covered, because the parts of the cover 1 corresponding to the respective positions on the above-mentioned parts are thus cut out. Therefore, functions of the automobile are not affected and its travelling is not hampered.

The adhesive may be applied on the overall surface of the automobile body on which the cover 1 is to be put or the bonded regions may be sporadically located. In attaching the cover, in the vicinity of cut-out portions of the cover 1, an adhesive with high bonding strength may be applied, or at least another adhesive with normal strength may be applied on the overall outer periphery of the vicinity. In this way, the cover 1 is prevented from being stripped off the automobile body due to wind, etc. For the adhesive, a material should be chosen which may allow removal of the cover 1 off the automobile body after it has been put thereon. In the place of such adhesives, metal hook buttons, fasteners, etc., may be employed, or any other methods which enable the cover to be removably attached from the automobile body 10 are permissible. Thus, the covering parts of the cover 1 are attached to the respectively corresponding parts of the automobile body 10. The rear view mirrors 15 and 16 once detached may be again attached by inserting their leg parts 15a and 16a in the holes 17 and 18 for rear view mirror legs after completion of covering the body with the cover 1. As described above, according to the invention, since the cover 1 is adapted to be removably attached on the automobile body 10, the color and the pattern may be readily changed. Furthermore, in order to increase the weathering resistance of the cover 1, a teflon coating may be applied, or fashionable enjoyment will be achieved by providing therewith such a pattern as polka dots, etc., without limiting the design to a single color. By making use of a material which is weatherproof for the cover 1, waxing is not necessary to maintain easy removal of soil. The cover 1 may be so designed as to be cleaned after its removal from the automobile body. Moreover, the color and pattern of the surface of the cover 1 may be variously changed, so that the cover 1 may be readily utilized as a display for advertisement and other information. It is not only possible to portray letters or drawings, but also to print them on the cover sheet. Besides, a wide variety of displays may be replaced even every day or from season to season.

For the covering parts 12 for the hood which forms the upper part of the engine compartment of the automobile body, it is necessary to choose a material which is not only waterproof and weatherproof but is also heat resistant. Covering parts other than the hood covering part 12 may be also formed of a heat resistant covering sheet.

Figure 4:
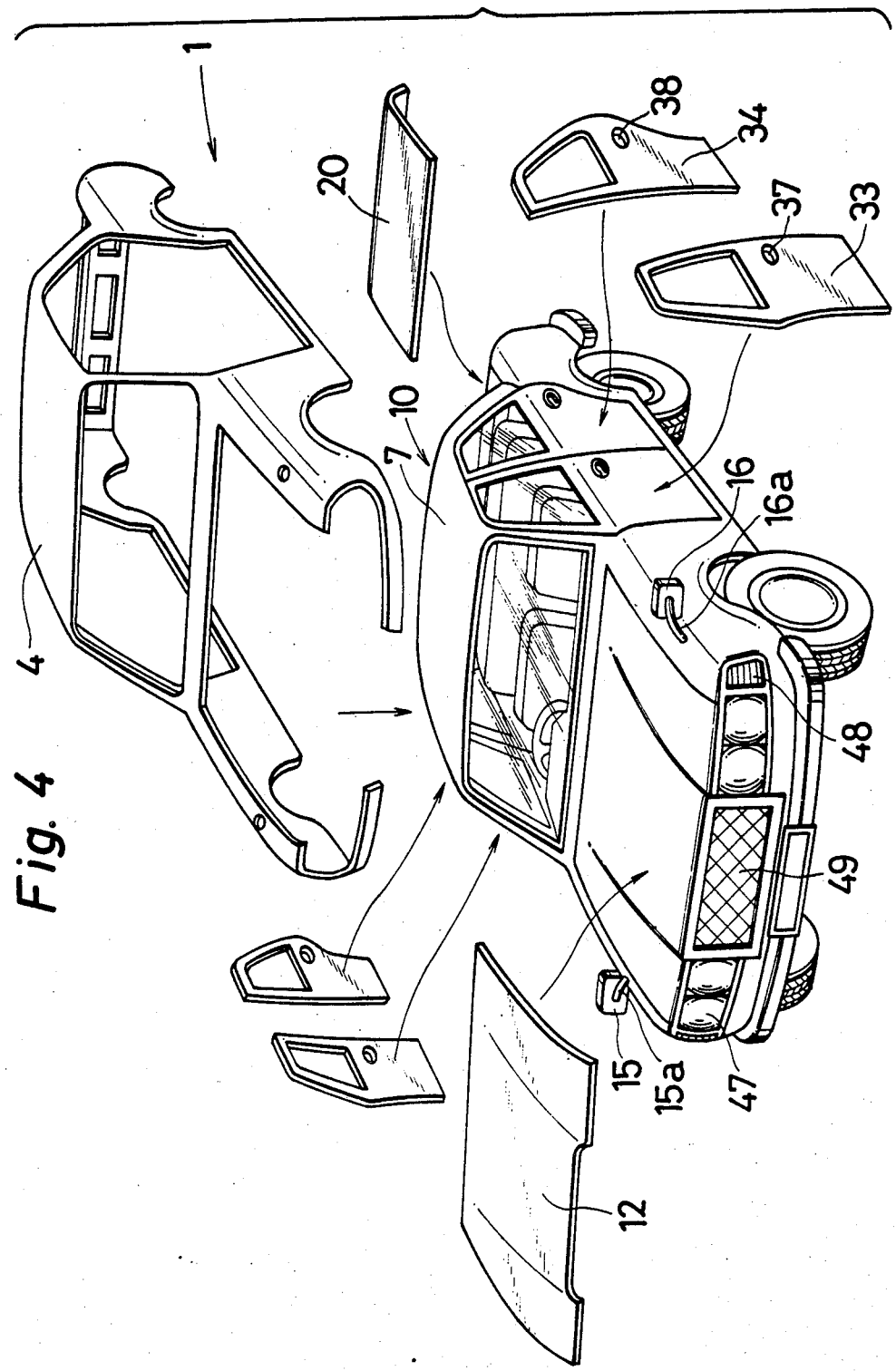
FIG. 4 is a perspective view of another embodiment of the invention.

While in the embodiments shown in FIGS. 1 to 3, the cover 1 is made substantially integral so that it can cover the outer peripheral surface of the automobile body 10, in another embodiment of this invention as shown in FIG. 4, the cover 1 may be divided into such individual components as the hood covering part 12, the trunk lid covering part 20, the front door covering part 33, and the rear door covering part 34. This embodiment is analogous to the aforementioned embodiment and is represented by same reference numbers assigned to corresponding parts. The windows of the automobile body 10, handles, key inserting holes, and such lighting equipment as headlights 47, taillights 26 and the like are not covered by the cover 1 in this embodiment, just as in the previously mentioned embodiment. The present invention is not limited to the shapes of the automobile body 10 shown in FIGS. 1 to 4, but is suitably applicable to vehicle bodies of any vehicle type including either bus or truck, etc. Since the outer periphery of the automobile body 10 is adapted to be covered with a cover 1, the parts of the coated metal surface of the automobile body 10 that are exposed to ambient air are reduced. Therefore, overheating of the vehicle body in summertime is avoided. In addition, the cooling effect due to the cold outside air in winter time is moderated. Thus, through mitigation of heat conduction between inside and outside of an automobile body 10, the efficiency of cooling and heating the inside of the automobile body 10 may be improved. Furthermore, the cover performs the function of protecting the surface of the automobile body 10 from damage or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A vehicle body covered with a vehicle body cover which comprises:
a front cover part, a rear cover part, a pair of side cover parts, and a roof cover part:
said front cover part having portions adapted to cover only a hood, an area around a windshield and tops of front fenders of a vehicle body, the portion covering the hood being separated from the portions covering the tops of the fenders by cuts in said front cover part, said front cover part having an un-cut portion corresponding to a position at which the hood is hinged to the car body, said front cover part having a cut-out at a position corresponding to the windshield of the vehicle body and said front cover part having at least one cut-out at a position corresponding to where a rear view mirror is attached to the vehicle body;
said rear cover part having portions adapted to cover an area around a rear window, a trunk lid and a rear end of the vehicle body, the portion covering the trunk lid separated from the rest of said rear cover part by cuts corresponding to three sides of the trunk lid and an un-cut portion corresponding to a position at which the trunk lid is hinged to the vehicle body, said rear cover part having a hole at a position corresponding to a trunk lid lock, a cut-out portion at a position corresponding to the rear window of the vehicle body, a cut-out at a position corresponding to a license plate of the vehicle body and cut-outs at positions corresponding to rear taillights of the vehicle body;

said pair of side cover parts each having a portion adapted to cover a front fender, a portion adapted to cover a front door, a portion adapted to cover a rear door and a portion adapted to cover a rear fender of the vehicle, said portion adapted to cover the front door having an un-cut portion at a position corresponding to a hinged edge of the front door, cuts at positions corresponding to the remainder of the front door to allow opening and closing of the front door, a cut-out at a position corresponding to a front door window, a cut-out at a position corresponding to a front door handle and a hole at a position corresponding to a front door lock, said portion adapted to cover the rear door having an un-cut portion at a position corresponding to a hinged edge of the rear door, cuts at positions corresponding to the remainder of the rear door to allow opening and closing of the rear door, a cut-out portion at a position corresponding to a rear door window and a cut-out portion at a position corresponding to a rear door handle;

said roof cover part having respective portions integrally joined to said front cover part, said rear cover part and said pair of side cover parts;

said front cover part, said rear part, said pair of side cover parts and said roof cover part being directly joined to the vehicle body by means of an adhesive; and, said vehicle body cover being coated with teflon.

2. A vehicle body covered with a vehicle body cover which comprises:

a front cover part, a rear cover part, a pair of side cover parts, and a roof cover part;

said front cover part having portions adapted to cover only a hood, an area around a windshield and tops of front fenders of a vehicle body, the portion covering the hood being separated from the portions covering the tops of the fenders by cuts in said front cover part, said front cover part having an un-cut portion corresponding to a position at which the hood is hinged to the car body, said front cover part having a cut-out at a position corresponding to the windshield of the vehicle body and said front cover part having at least one cut-out at a position corresponding to where a rear view mirror is attached to the vehicle body;

said rear cover part having portions adapted to cover an area around a rear window, a trunk lid and a rear end of the vehicle body, the portion covering the trunk lid separated from the rest of said rear cover part by cuts corresponding to three sides of the trunk lid and an un-cut portion corresponding to a position at which the trunk lid is hinged to the vehicle body, said rear cover part having a hole at a position corresponding to a trunk lid lock, a cut-out portion at a position corresponding to the rear window of the vehicle body, a cut-out at a position corresponding to a license plate of the vehicle body and cut-outs at positions corresponding to rear taillights of the vehicle body;

said pair of side cover parts each having a portion adapted to cover a front fender, a portion adapted to cover a front door, a portion adapted to cover a rear door and a portion adapted to cover a rear fender of the vehicle, said portion adapted to cover the front door having an un-cut portion at a position corresponding to a hinged edge of the front door, cuts at positions corresponding to the remainder of the front door to allow opening and closing of the front door, a cut-out at a position corresponding to a front door window, a cut-out at a position corresponding to a front door handle and a hole at a position corresponding to a front door lock, said portion adapted to cover the rear door having an un-cut portion at a position corresponding to a hinged edge of the rear door, cuts at positions corresponding to the remainder of the rear door to allow opening and closing of the rear door, a cut-out portion at a position corresponding to a rear door window and a cut-out portion at a position corresponding to a rear door handle;

said roof cover part having respective portions integrally joined to said front cover part, said rear cover part and said pair of said cover parts;

said front cover part, said rear cover part, said pair of side cover parts and said roof cover part being directly joined to the vehicle body by means of an adhesive; and, said vehicle body cover consisting essentially of a flexible synthetic resin.

* * * * *